United States Patent

[11] 3,599,779

[72] Inventor Peter F. Coe
 Bedford, England
[21] Appl. No. 828,924
[22] Filed May 29, 1969
[45] Patented Aug. 17, 1971
[73] Assignee Lever Brothers Company
 New York, N.Y.

[54] APPARATUS FOR MECHANICALLY HANDLING CYLINDRICAL ARTICLES
 1 Claim, 6 Drawing Figs.
[52] U.S. Cl. .................................................. 198/127
[51] Int. Cl. ................................................ B65g 13/071
[50] Field of Search ........................................... 198/127, 22; 263/6 C

[56] References Cited
UNITED STATES PATENTS
2,054,440 9/1936 Paxton ............... 198/127
2,387,211 10/1945 Barnby et al. ............ 198/22

Primary Examiner—Evon C. Blunk
Assistant Examiner—Johnny D. Cherry
Attorneys—Louis F. Kline, Jr., Melvin H. Kurtz and Edgar E. Ruff ABSTRACT: Apparatus for mechanically handling cylindrical articles which are supported and rotated in valleys between a series of rotors, having a pressure pad which is operable to engage cylindrical articles in one valley to as to effect transfer of the articles to the next valley.

PATENTED AUG 17 1971

INVENTOR:
PETER FREDERICK COE

BY *Louis T. Kline, Jr.*
HIS ATTORNEY

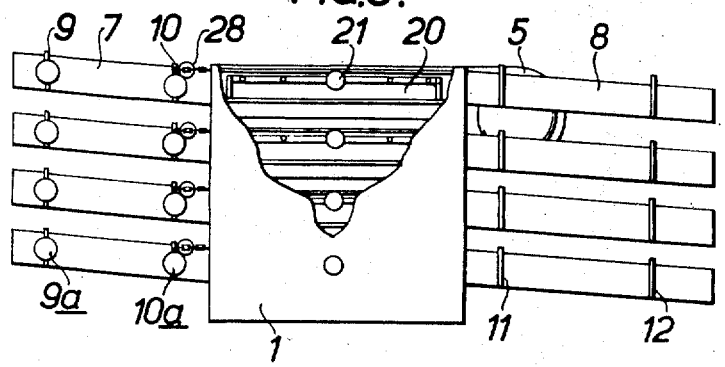
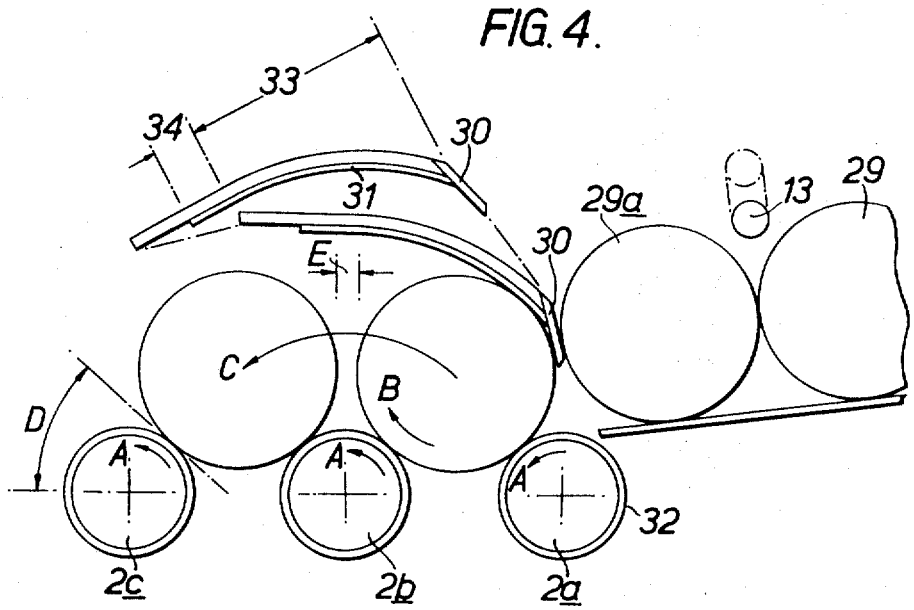

APPARATUS FOR MECHANICALLY HANDLING CYLINDRICAL ARTICLES

This invention relates to apparatus for mechanically handling cylindrical articles such as cylindrical cans or the like and particularly to apparatus for rotating the cylindrical articles while transporting them, for example, through a treatment chamber such as a cooker.

In the handling of cylindrical articles and in the processing of the contents of cylindrical containers it is sometimes convenient and desirable to support the cylindrical articles or containers in the valleys formed between two or more adjacent rotors. In this way the articles can be supported and rotated by the rotors.

For example in the canning of food products it is possible to carry out heat treatment of the contents of the containers, i.e. heating or cooling etc., while the cans are supported in a valley between rotors which are rotated to rotate the cans and agitate the contents. However with such a system it is difficult to feed the cans into such valleys in a conveniently mechanized way, and the present invention is concerned with this problem.

According to the present invention there is provided apparatus for handling cylindrical articles comprising a series of cylindrical rotors having their axes parallel and spaced apart to form valleys between the rotors for supporting and rotating the cylindrical articles, and a pressure pad movable from a first upper position to a second lower position to engage and grip between the pressure pad and one of the rotors a cylindrical article rotating in a valley to transfer the article to the valley on the opposite side of the rotor against which it is gripped.

The pressure pad thus enables the cylindrical articles to be conveniently fed into the valleys between rotors and provides a conveniently mechanized system.

The pressure pad in the second position is adapted to maintain the cylindrical article gripped between the rotor and the pressure pad at least until the inertia of the cylindrical article is sufficient to carry the center of gravity of the article over a vertical line passing through the centerline of that rotor so that the cylindrical article drops into the next valley. Conveniently the pressure pad can be adapted to maintain the article gripped between the pad and the rotor until the center of gravity of the article has passed over the vertical line.

The pressure pad should preferably contact the cylindrical article at a point on its periphery which is diametrically opposite the point of contact of the cylindrical article with the relevant rotor.

Conveniently the pressure pad can have an arcuate operating surface having a radius equal to the sum of the radius of the rotor together with the diameter of the cylindrical article. Thus, when the pressure pad is in the second position, the center of curvature of the operating surface coincides with the center of the relevant rotor and the operating surface is spaced at a constant radial distance, equal to the diameter of the cylindrical article, from the rotor.

Alternatively the operating surface of the pressure pad can be a flat or curved surface adapted, in the second position, for movement relative to the rotor to maintain the cylindrical article gripped therebetween and transfer the article to the next valley.

Depending upon the material of the cylindrical articles it may be preferable to provide the operating surface of the pressure pad with a facing of a material having a high coefficient of friction which, for example, with metal cans will enhance the grip between the pressure pad and the articles. This is particularly desirable when the articles are being subjected to a treatment which results in the articles becoming wet; in these circumstances it may be advantageous for the surface of the friction facing to be roughened.

Likewise the rotors can be provided with a facing of a material having a high coefficient of friction to enhance the grip between the articles and the rotors. The friction facing on the pressure pad and the rollers can be a rubber or like material having a hardness of from 40 to 60 International Rubber Hardness Degrees (IRHD). The rubber facing on the rotors also provides a degree of shock resistance to the articles as they drop into the valleys thereby minimizing damage to the articles and wear on the rotors.

An inclined surface can terminate adjacent the valley in which the cylindrical articles are engaged by the pressure pad and single feed means can be provided to feed the articles singly from the inclined surface to the first valley. Having fed the articles to the first valley from the inclined surface the pressure pad transfers the articles to the second adjacent valley, the transfer of the articles from the second valley being effected by the article being transferred from the first valley which contacts the article in the second valley and partly pushes and partly acts as a pressure pad to effect the transfer of the article from the second valley to a third valley. Thus the operation of the pressure pad in the first valley will effect the transfer of articles in a number of consecutive valleys in which articles are present.

The single feed means can comprise an escapement blade secured to the pressure pad and a gate movable into the path of articles on the inclined surface.

The invention will now be more particularly described with reference to the diagrammatic drawings accompanying the provisional specifications in which:

FIG. 3 is an end elevation of the cooker of FIGS. 1 and 2;

FIG. 4 shows on an enlarged scale the pressure pad in relation to the rotors;

Figure 1:
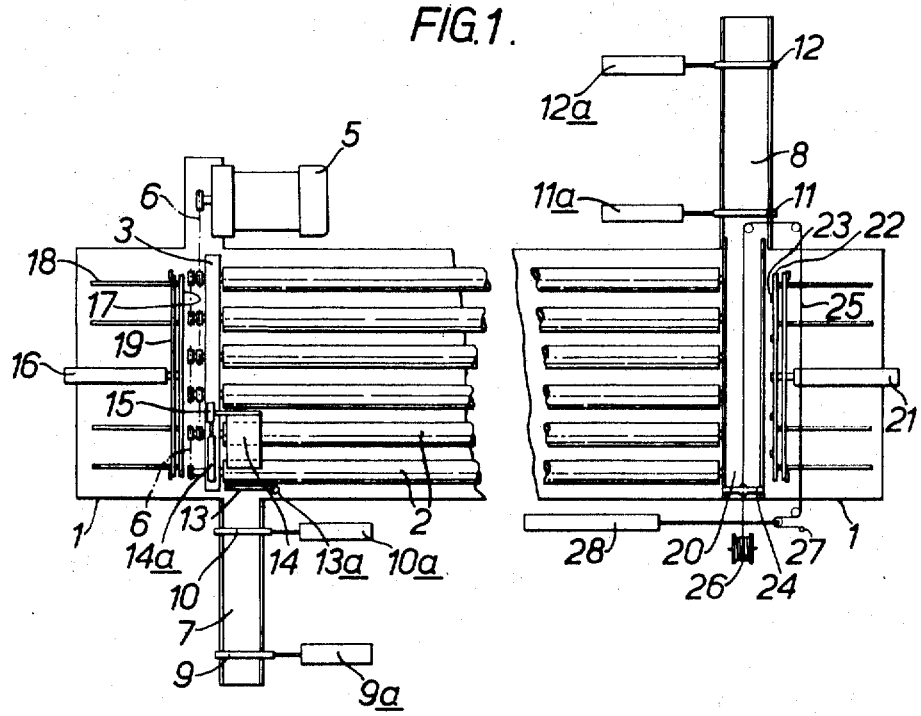
FIG. 1 is a plan view of a cooker for heat treating the contents of cylindrical cans in which the upper wall of the cooker is removed.
Figure 2:
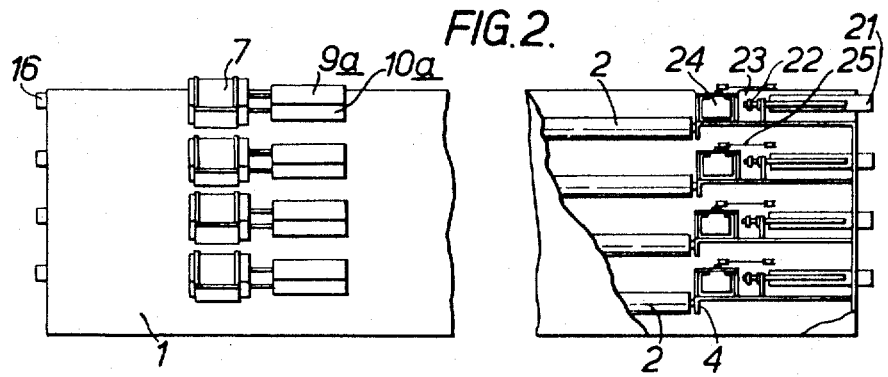
FIG. 2 is a side elevation of the cooker of FIG. 1.

Referring to FIGS. 1 to 3 the cooker comprises an outer casing 1 within which a number of rotors 2 are mounted horizontally side-by-side, rotatably supported at their ends in bearing supports 3 and 4. Rotation of the rotors each in the same sense is by means of an electric motor 5 driving through a series of chain drives 6 to the shafts of the rotors 2 which extend through the bearing support 3.

As shown in FIGS. 2 and 3, four tiers of rotors are disposed in the cooker with a single electric motor arranged to rotate all of the rotors.

Inlet passages 7 and discharge passages 8 inclined to the horizontal communicate with the interior of the cooker corresponding to each tier of rotors and are each provided with double lock sliding doors 9, 10, 11 and 12 operated by pneumatic cylinders 9a, 10a, 11a and 12a. Within the inner inlet door 10 input of the cans is controlled by a vertically movable gate 13 and a pressure pad 14 pivotally mounted in a pivot block 15 secured to the bearing block 3. Both the gate and the pressure pad are operated by pneumatic cylinders 13a and 14a respectively as hereinafter described.

Mounted at the inlet end of the cooker is a pneumatic cylinder 16 which carries on its operating rod a can input bar 17. The bar 17 is prevented from rotating by guide bars 18 running in a guide block 19.

At the discharge end of the rotors the bottom surface of the inclined passage 8 aligns with a discharge platform 20 which extends across the ends of the rotors at a level below that of a can supported between the rotors. A pneumatic cylinder 21 carries, in the same manner as the cylinder 16, a can discharge bar 22 having magnets 23 secured thereto in alignment with the valleys between the rotors 2. A plough 24 is attached to a wire cable 25, one end of the cable being attached to a spring loaded drum 26 and the other end to a fixed point 27 on the cooker. A pneumatic cylinder 28 effects movement of the plough along the discharge platform 20.

Referring now to FIG. 4, cans 29 roll along the inclined surface of the inlet passage 7 and with the gate 13 in the raised position and the pressure pad 14 in the lower position the first can rolls into the position illustrated at 29a where it contacts an escapement blade 30 secured to the end of the pressure pad 14. The gate 13 is lowered to retain the cans other than the can 29a in contact with the escapement blade and the pressure pad is raised. The first can 29a is then free to roll from the end of the passage 7 and settle in the valley between the rotors 2a and 2b. The rotors are rotating in the direction of the arrows A so that the can is rotated about its longitudinal axis in a clockwise direction as shown by the arrow B. To transfer the can into the next adjacent valley between the rotors 2b and 2c the pressure pad is lowered to engage and grip the can between the pressure pad and the rotor 2b, the grip on the can being facilitated by a facing of rubber or like material 31 to the operating surface of the pressure pad and a covering of rubber or like material on the periphery of the rotors as shown at 32. The rubber or like material should be resistant to the conditions pertaining within the cooker and is preferably of a hardness of from 40 to 60 IRHD. When the can is gripped between the rotor and the pressure pad the rotary motion of the can will become a planetary motion, the centerline of the can following an arcuate path around the axis of the rotor 2b as shown by arrow C.

The operating surface of the pressure pad is arcuate as shown at 33 so that as the can climbs up the face of the rotor 2b the grip on the can between the pad and the rotor is maintained with point of contact between the pad and the can diametrically opposite the point of contact between the can and the rotor 2b. Vertically above the axis of the rotor 2b the operating surface of the pad becomes, when the pressure pad is in the operative position, a flat surface as at 34. Thus as a can passes over the highest point of the rotor 2b the grip on the can is released and it drops into the valley between the rotors 2b and 2c.

When the pressure pad is lowered as described above the gate 13 is raised to allow the next can to roll forward into contact with the escapement blade 30. Thus when the transfer of the first can has been effected, the gate 13 is lowered and the pressure pad 14 is raised to allow the second can to roll into the valley between the rotors 2a and 2b as before. Similarly the pressure pad is again lowered to grip the second can between the pad and the rotor 2b; the gate is also raised to allow the third can to roll into contact with the escapement blade 30.

After the second can has climbed up the rotor 2b a short distance it comes into engagement with the first can which is rotating in a clockwise direction in the next valley between rotors 2b and 2c. Thus at the point of contact between the two cans they are contrarotating and the friction therebetween acts similarly to the pressure pad but by a smaller amount to encourage the first can to ride up the face of the rotor 2c. This, together with the positive push exerted by the second can which is being positively transferred by the pressure pad in cooperation with the rotation of the rotor 2b, acts to transfer the first can to the next adjacent valley, thereby allowing the second can to fall into the valley between the rotors 2b and 2c.

In a cooker as shown in FIGS. 1 to 3 the transfer operation is repeated to feed cans transversely across the rotors to each of the valleys. The gate 13 and the escapement blade 30 provide single feed means to control the number of cans allowed to roll from the passage 7 since otherwise several cans could roll from the inclined surface onto the rotors. The gate and escapement blade can be replaced by any means which provides single can feeding to the first valley.

When a can is in each of the valleys the pneumatic cylinder 16 is actuated to move the input bar 17 into contact with the cans and push them along the valleys. The bar 17 is then retracted to allow further cans to be fed to the valleys by the pressure pad. The cans are pushed by the input bar a distance slightly greater than the lengths of the cans to prevent fouling between cans present in the valleys and cans being fed to the valleys.

As the cans approach the discharge end of the valleys the pneumatic cylinder 21 is actuated to bring the discharge bar 22 adjacent the ends of the cans so that the magnets each grip a can. The discharge bar is then returned to the position shown in FIG. 1, the magnets withdrawing a can from each valley onto the discharge platform 20. The plough 24 is then moved by actuation of the pneumatic cylinder 28 to push the cans into the inclined discharge passage 8, the cans passing out through the locks 11 and 12.

As shown in FIG. 4, the angle of contact D (i.e. the angle that the common tangent at the point of contact between the cans and the rotors makes with a line passing through the axes of the rotors) is between 30° and 50°. The lower limit for this angle is governed by the stability of the cans in the valleys while being rotated and when being transferred from valley to valley. If the angle is too low control of the cans will be lost. A number of factors affect the stability of the can, in particular the length to diameter ratio of the can, but in general the lower the contact angle the lower the stability.

The upper limit of the contact angle is governed by the ability of the can to climb up the face of the rotor and the risk of damage to the can and/or rotor as the can drops into the next valley.

For a given diameter of can the diameters of the rotors and the distance between their axes can be determined to give the desired angle of contact D and clearance E as shown in FIG. 4 between the cans.

To function efficiently the pressure pad, while being movable from the upper position to the lower position, should be rigidly mounted and not allowed to bounce when moved to the lower position in engagement with the can. The grip between the pad and the can is a function of the pressure exerted by the pad on the can and this pressure can be due either to the weight of the pressure pad or be supplemented by urging the pressure pad into contact with the can. In the embodiments described this is conveniently effected by the pneumatic cylinder arranged to effect the pivoted movement of the pressure pad.

Figure 5:
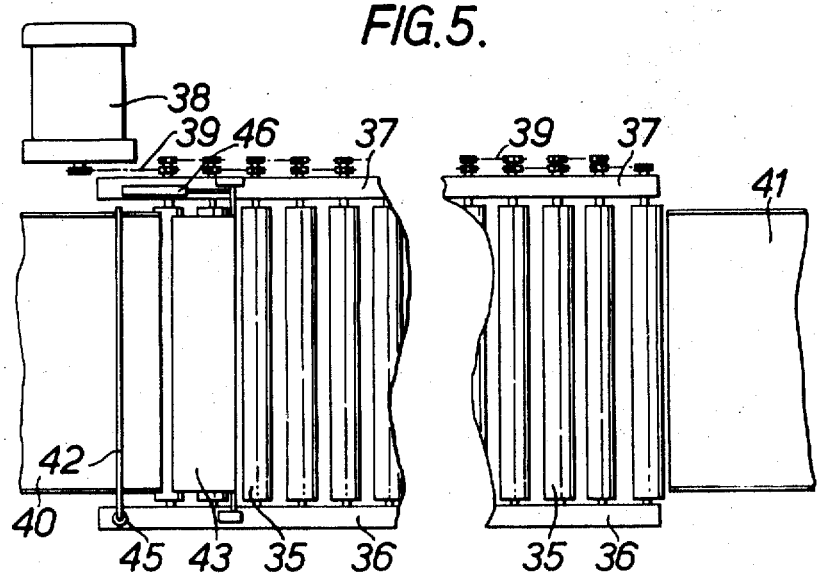
FIG. 5 is a plan view of an alternative arrangement to that of FIGS. 1 to 3.
Figure 6:
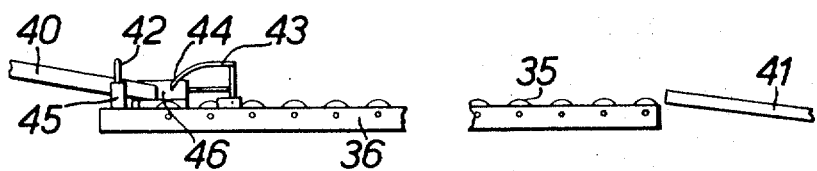
FIG. 6 is a side elevation of the arrangement of FIG. 5.

An alternative arrangement of rotors is shown in FIGS. 5 and 6 which can be enclosed in a casing similar to that shown in FIGS. 1 to 3 to form a cooker or the like for processing the contents of cans. In this arrangement the rotors 35 are rotatably supported in bearing blocks 36 and 37 and driven by an electric motor 38 through chain drives 39. An inclined surface 40 slopes down to the first rotor at one end and a discharge inclined surface 41 slopes away from the last rotor at the opposite end. The inclined surfaces 40 and 41 extend across substantially the full length of the rotors 35 as does a gate 42 and a pressure pad 43, one end of which 44 forms an escapement blade. The gate and pressure pad are operated by pneumatic cylinders 45 and 46 respectively.

Cans roll side-by-side down the inclined surface 40 until the forward cans contact the escapement blade 44. The gate 42 is lowered and the pressure pad 43 is raised to allow the forward cans to roll into the first valley. The pressure pad is then lowered to transfer the cans into the next valley as before and the gate is raised to allow the further cans to roll into contact with the escapement blade. The cycle is repeated to feed further cans to the first valley and to progress the cans supported by the rotors from one valley to the next until they roll down the discharge inclined surface 41.

A single tier of apparatus as shown in FIGS. 1 to 3 was constructed having 8 rotors each 2 1/16 inches diameter with their axes spaced-apart 3¼ inches. The operating surface of the pressure pad, which had a radius of 4 inches, and that part of the rotors across which the cans were transversely conveyed were covered with a smooth heat resistant rubber of 40 IRHD ⅛ inches thick. The apparatus was used to process cans of 3 inches diameter, 4 1/16 inches long and weighting 16 ounces. The contact angle was 40° and the clearance was ¼ inches. The rotors were driven at speeds ranging between 50 r.p.m. and 150 r.p.m. and the pressure pad engaged the cans under the influence of its own weight which averaged one pound over the operating surface with which it was in contact with the cans, and air pressure in the pneumatic operating cylinder 14a.

The cans were successfully transferred across the valleys between the 8 rotors when wetted by the steam heating of the cooker.

The apparatus was also used to process cans 4 1/16 inches diameter, 4 11/16 inches long and weighing 28 ounces, the only modification to the apparatus being that the axes of the rotors were spaced 4½ inches apart. This gave a contact angle D of 47° and a clearance E of 7/16 inches. As before, the rotors were driven at speeds ranging between 50 r.p.m. and 150 r.p.m. and the cans were transferred across the valleys between the 8 rotors by the pressure pad when wetted by the steam heating of the cooker. In this case the preferred radius of curvature of the operating surface of the pressure pad would be about 5 inches but a pressure pad having a radius of 4 inches was again employed. In operation the pressure pad pivoted to maintain an effective grip on the can between the pad and the rotor to transfer the cans.

I claim:

1. Apparatus for handling cylindrical articles comprising a series of cylindrical rotors, mounting means for rotatably supporting the cylindrical rollers in parallel spaced relation to form valleys therebetween, driving means for rotating the rotors to rotate cylindrical articles supported in the valleys, a pressure pad having an operating surface disposed above the rotors, and operating means adapted to move the pressure pad between a first upper position and a second lower position, the operating surface of the pressure pad in the second lower position engaging and gripping between the pressure pad and one of the rotors a cylindrical article to transfer the article to a valley on the opposite side of the rotor against which it is gripped, an inclined inlet passage adapted to feed the cylindrical articles to the valley in which the cylindrical articles are engaged by the pressure pad and single feed means comprising an escapement blade secured to the pressure pad, a movable gate, and means for moving the gate between a position in which the gate lies in the path of articles on the inlet passage and a position in which the gate lies outside the path of articles on the inlet passage.